(12) United States Patent
Paterson et al.

(10) Patent No.: US 6,519,503 B2
(45) Date of Patent: Feb. 11, 2003

(54) COLLATION SYSTEM AND METHOD

(75) Inventors: Edward Paterson, Toronto (CA);
Edward J. Cook, Toronto (CA);
Naofumi Tateishi, Toronto (CA)

(73) Assignee: Longford Equipment International Limited, Scarborough (CA)

( * ) Notice: Subject to any disclaimer, the term of this patent is extended or adjusted under 35 U.S.C. 154(b) by 0 days.

(21) Appl. No.: 09/850,436

(22) Filed: May 7, 2001

(65) Prior Publication Data

US 2002/0165640 A1 Nov. 7, 2002

(51) Int. Cl.$^7$ .................................. G06F 7/06
(52) U.S. Cl. .................. 700/226; 700/215; 700/224; 270/52.02
(58) Field of Search ................. 700/214, 215, 700/219, 220, 221, 223, 224, 225, 226; 270/52.02, 52.15; 271/3.13

(56) References Cited

U.S. PATENT DOCUMENTS

| | | | | |
|---|---|---|---|---|
| 3,864,559 A | * | 2/1975 | Mori et al. ............. | 235/151.32 |
| 4,358,016 A | * | 11/1982 | Richardson et al. ........ | 209/564 |
| 4,626,672 A | * | 12/1986 | Sapitowicz et al. ......... | 235/480 |
| 4,651,983 A | | 3/1987 | Long ............................ | 271/35 |
| 4,733,359 A | | 3/1988 | Luperti et al. ............... | 364/478 |
| 5,013,022 A | * | 5/1991 | Graushar ...................... | 270/56 |
| 5,027,587 A | | 7/1991 | Ramsey ........................ | 53/493 |
| 5,050,106 A | * | 9/1991 | Yamamoto et al. .......... | 364/550 |
| 5,207,412 A | * | 5/1993 | Coons, Jr. et al. ............ | 270/1.1 |
| 5,383,130 A | * | 1/1995 | Kalisiak ...................... | 364/471 |
| 5,510,997 A | | 4/1996 | Hines et al. ................. | 364/478 |
| 5,544,043 A | | 8/1996 | Miki et al. ................... | 364/406 |
| 6,075,617 A | * | 6/2000 | Fischer et al. .............. | 358/1.16 |
| 6,151,534 A | * | 11/2000 | Smith et al. ................. | 700/223 |
| 6,192,295 B1 | * | 2/2001 | Gunther ....................... | 700/225 |
| 6,224,048 B1 | * | 5/2001 | Motamed ................... | 270/52.02 |
| 6,305,550 B1 | * | 10/2001 | Berz ........................... | 700/223 |
| 6,316,741 B1 | * | 11/2001 | Fitzgibbons et al. ........ | 700/224 |
| 6,370,445 B1 | * | 4/2002 | Olson et al. ................. | 700/219 |
| 6,386,537 B1 | * | 5/2002 | Howard et al. ........... | 270/52.02 |
| 6,437,272 B2 | * | 8/2002 | Tamamoto et al. .......... | 700/226 |

FOREIGN PATENT DOCUMENTS

GB          2 195 319 A      4/1988

* cited by examiner

*Primary Examiner*—Douglas Hess
(74) *Attorney, Agent, or Firm*—David P. Gordon; David S. Jacobson; Thomas A. Gallagher

(57) ABSTRACT

A system for collating cheques (or other sheets bearing an account number), feeds cheques in a batch of cheques. The system reads the account number of each cheque in the batch and counts the number in the batch. This is compared with corresponding information on an associated account statement. On a mis-match, action is taken (e.g., an alarm is raised).

23 Claims, 3 Drawing Sheets

COLLATION SYSTEM AND METHOD

BACKGROUND OF THE INVENTION

This invention relates to a system and method for collating sheets, each bearing an account number.

Business cheques, after clearing, are typically returned to the business with a copy of an account statement providing a summary of the cheques. This summary includes the account number on which the cheques were written and the number of cheques included with the statement.

Currently, used cheques are typically pre-sorted by company then manually associated with the proper account statement and inserted in an envelope.

In U.S. Pat. No. 4,733,359 to Luperti, bank cheques belonging to a cheque batch are fed, counted and stacked while the associated statement is fed to an imaging station. At the imaging station, a number representing the number of cheques summarised on the statement is imaged and displayed. An operator makes a visual comparison of the displayed imaged number and the number of cheques actually counted. If these numbers match, the operator initiates a cycle whereby the statement and cheques are collated.

There remains a need for an automated system for accurately collating cheques and other negotiable instruments with statements.

SUMMARY OF INVENTION

A system for collating cheques (or other sheets bearing an account number), feeds cheques in a batch of cheques so that the batch is synchronised with a conveyed associated document (e.g., account statement). The system reads the account number of each cheque in the batch and counts the number in the batch. This is compared with corresponding information on the associated document. On a mis-match, action is taken (e.g., an alarm is raised, for example a signal is given to a parent machine).

According to the invention, there is provided a system for collating sheets each bearing an account number, comprising: a feeder for singly feeding sheets; a detector for detecting fed sheets; a reader for reading an account number on said fed sheets; an accumulator downstream of said feeder for accumulating sheets into a stack and for conveying each accumulated stack downstream; a processor for: receiving an account number and batch size read from each of a plurality of documents on a document conveyor; obtaining a batch count for a given batch of sheets based on indications from said detector; receiving from said reader said account number read from each sheet of said given batch; comparing said received indication of a batch quantity read from one of said documents with said batch count obtained for said given batch; comparing said received, account number read from said one of said documents with said account number read from each sheet in said given batch; and acting based on each said comparing.

According to another aspect of the invention, there is provided a system for collating sheets each bearing an account number, comprising: a feeder for singly feeding sheets; a detector and reader for detecting fed sheets and for reading an account number on said fed sheets; an accumulator downstream of said feeder for accumulating sheets into a stack and for conveying each accumulated stack downstream; a processor for: receiving an account number and batch size read from each of a plurality of documents on a document conveyor; obtaining a batch count for a given batch of sheets based on indications from said detector and reader; receiving from said detector and reader said account number read from each sheet of said given batch; comparing said received indication of a batch quantity read from one of said documents with said batch count obtained for said given batch; comparing said received account number read from said one of said documents with said account number read from each sheet in said given batch; and acting based on each said comparing.

According to a further aspect of the invention, there is provided a method for collating sheets each bearing an account number, comprising: singly feeding sheets from a stack; detecting sheets fed from said stack; reading an account number on said sheets fed from said stack; receiving an account number and batch size read from each of a plurality of documents on a document conveyor; obtaining a batch count for a given batch of sheets based on said detecting; comparing said received indication of a batch quantity read from one of said documents with said batch count obtained for said given batch; comparing said received account number read from said one of said documents with said account number read from each sheet in said given batch; and acting based on each said comparing.

BRIEF DESCRIPTION OF THE DRAWINGS

In the figures which illustrate an example embodiment of the invention.

DETAILED DESCRIPTION

Figure 1:
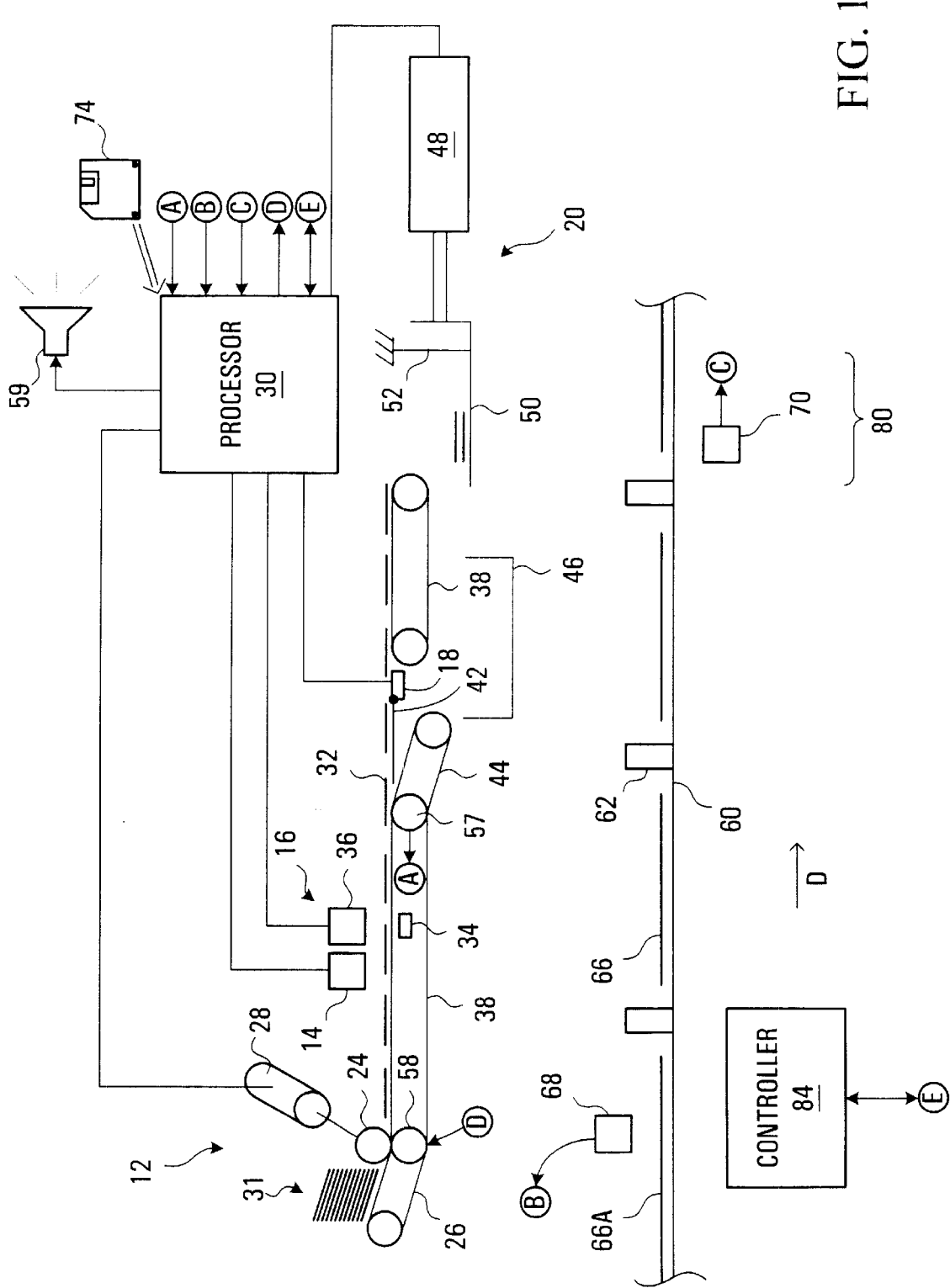
FIG. 1 is a schematic diagram of a system made in accordance with this invention.

Turning to FIG. 1, a system 10 for collating sheets bearing account information comprises, in downstream order, feeder 12, reader 14, detector 16, diverter 18, and accumulator 20.

The feeder 12 may be of the type described in U.S. Pat. No. 4,651,983 to Long, the contents of which are incorporated herein by reference, and have a pulsed feed wheel 24 which forms a nip with a lower conveyor 26. A stepper motor 28 selectively rotates the pulsed feed wheel through consecutive arcs. The stepper motor receives a control input from a processor 30. A stack 31 of sheets 32 rests on lower conveyor 26 of the feeder.

Where sheets 32 of the stack comprise bank cheques, traveller's cheques, or other negotiable instruments bearing account information, the account information is typically printed with magnetic ink in a character set suitable for magnetic ink character recognition (MICR). In such case, reader 14 may be any suitable MICR reader.

Detector 16 may comprise a light source 34 below a sheet conveyor 38 for providing a light beam to a photocell 36 above sheet conveyor 38. Processor 30 receives an output from photocell 36. Each time a sheet 32 interrupts the light beam from light source 34 to photocell 36, the photocell provides an indication to processor 30. As described more fully hereinafter, photocell 36 will also send indications to processor 30 when detecting pre-defined characteristics on special marker sheets 76 (FIG. 2) which are provided between batches.

Diverter 18 may have a cantilevered trap door 42 which opens upwardly when the diverter is prompted by processor 30. When open, the trap door deflects a sheet 76 downwardly onto diversion conveyor 44 and into bin 46.

Accumulator 20 may comprise an actuator 48 and a reciprocating table 50. The actuator receives a control input from processor 30 to actuate the reciprocating table 50. A stripper finger 52 extends to the table in order to strip any accumulated stack of sheets 32 off the table 50 when the table is retracted.

A motor 58 driving lower conveyor 26 and sheet conveyor 38 receives a control input from processor 30. A conveyor speed indicator 57, which may be a rotary encoder, outputs a conveyor speed signal to processor 30. Processor has a control input to an alarm 59, which may be an audible alarm.

A document conveyor 60 extends below collating system 10 and under table 50. Document conveyor 60 has flights 62 defining zones, each of which may carry a document 66 in downstream direction D. A reader 68 is positioned over the document conveyor and outputs to the processor 30. A document conveyor sensor 70, which may be a photocell, sends a "document present" signal to processor 30 indicating a document is at an insertion station 80. A controller 84 controls the document conveyor 60 and is connected for communication with processor 30.

The program control for processor 30 may be loaded from computer software medium 74 which may be, for example, a diskette, CD-ROM, or a file downloaded from a remote source.

Figure 2:
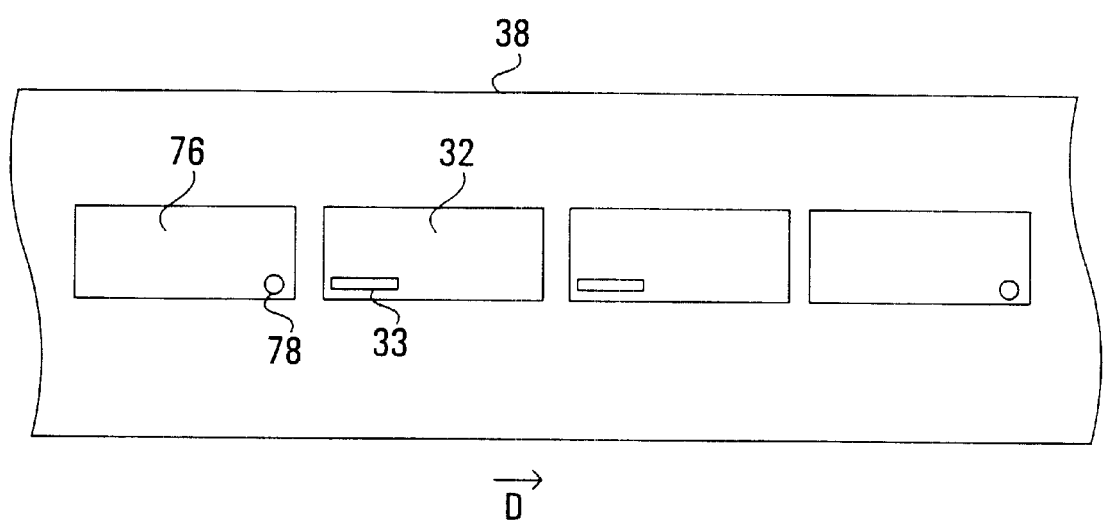
FIG. 2 is a plan view of a portion of the system of FIG. 1.

FIG. 2 illustrates a section of sheet conveyor 38 in plan view. Conveyor 38 carries sheets 32 and marker sheets 76. Each sheet 32 has an account number field 33 whereat an account number is printed. Each marker sheet 76 has a pre-defined characteristic in the nature of a hole 78 punched through it proximate its leading edge.

To prepare for operation, the processor is loaded with an indication of the distance between detector 16 and insertion station 80 as well as with the distance between detector 16 and diverter 18. Batches of sheets 32 are stacked one on top of the next so as to mirror the intended order for documents 66, with a marker sheet 76 on each batch. The resulting stack 31 of sheets is loaded into feeder 12.

Figure 3:
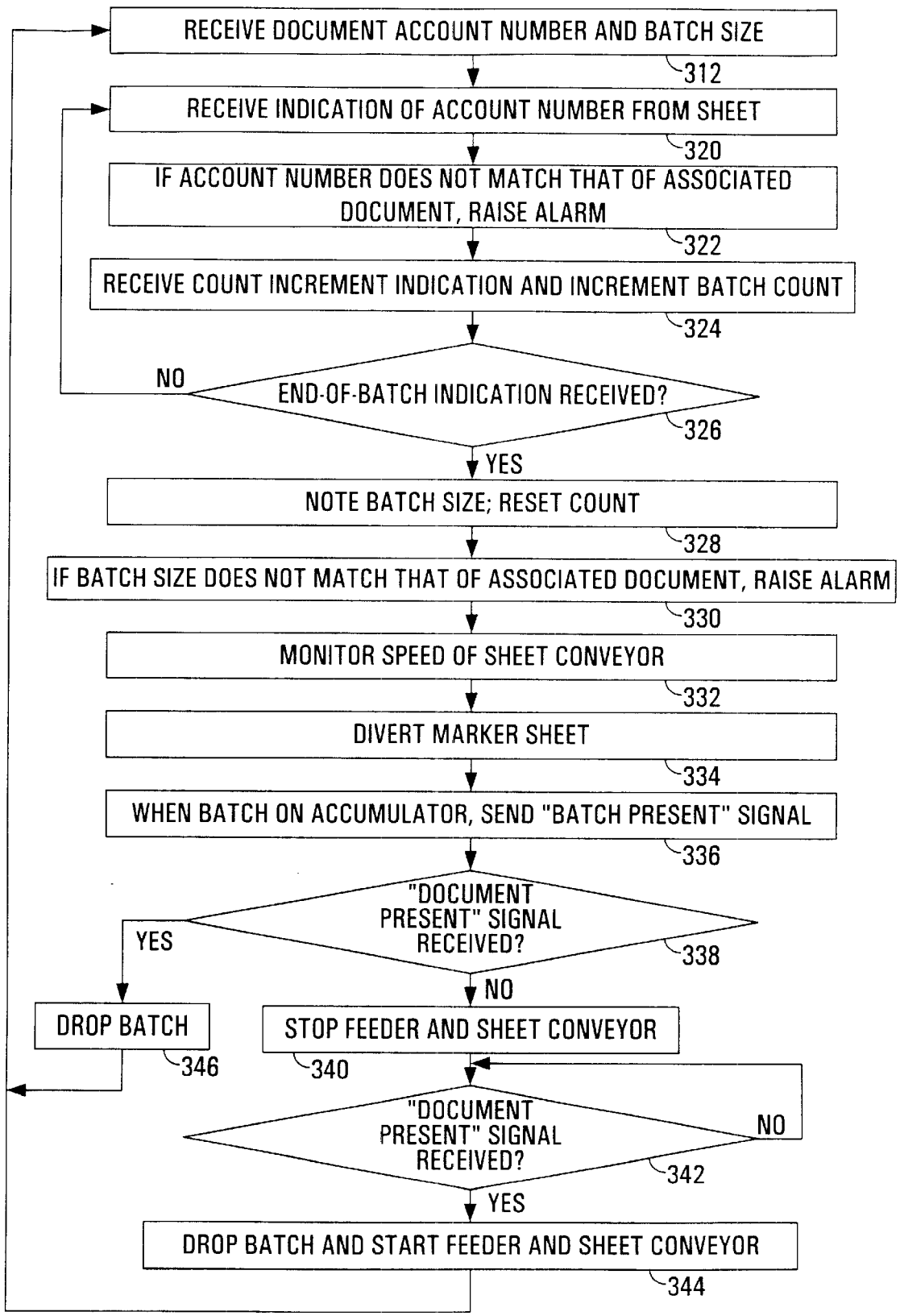
FIG. 3 is a flow diagram illustrating operation of the processor of FIG. 1.

With reference to FIG. 3, along with FIGS. 1 and 2, in operation, when a document 66a passes under reader 68, processor 30 receives an indication of an account number on the document and an indication of a number representing the number of sheets 32 in a batch which is associated with the document: the batch size (S312).

When not inhibited by processor 30, the feeder motor 28 and sheet conveyor motor 58 operate at a fairly constant rate to feed sheets onto and along conveyor 38. As sheets 32 pass under reader 14, the reader reads an indication of the account number on these sheets and passes this to processor 30 (S320). An indication is received by the processor each time a sheet 32 or 76 passes detector 16. When a marker sheet 76 passes detector 16, processor 30 receives two pulses in quick succession: one when the leading edge of sheet 76 interrupts the light beam to photocell 36 and a second when the beam is again interrupted after passing through hole 78 in the sheet. The processor interprets tins series of two pulses as an "end of batch" signal. Thus, the processor increments a batch count each time it receives a pulse from detector 16 (S324) until it receives an "end of batch" signal (S326). The "end of batch" signal apprises the processor that a marker sheet 76 is under detector 16. It also indicates that the entire batch has now passe d the detector 16 so that the processor has the final batch size (S328).

On receiving the "end of batch" signal, the processor 30 monitors the speed of sheet conveyor 38 based on signals from speed indicator 57 (S332). The processor has been loaded with the length of conveyor 38 between the detector 16 and the diverter 18. Thus, the processor can appropriately time the diverter to divert the marker sheet (which resulted in the "end-of-batch" signal) to bin 46 (S334). Further, the processor has been loaded with the length of conveyor 38 between the detector 16 and the accumulator 50. Thus, the processor will also know that the last sheet of the batch has reached accumulator 50 once the portion of the conveyor 38 on which the marker sheet rested has moved to the end of the conveyor. Once this occurs, the processor 30 sends a "batch present" signal to a controller for document conveyor 60 (S336). The processor may also stop feeder motor 28 and sheet conveyor motor 58 in order to stop feeder 12 and conveyor 38 (S340).

The processor knows that the first batch of sheets is intended to be associated with the first document 66 on conveyor 60. Thus, after stopping the feeder and conveyor, it awaits the first "document present" signal from sensor 70 indicating the presence of the first document 66a at the insertion station 80 (S342). Upon receipt of this signal, the processor controls actuator 48 to retract table 50 (S344). Stripper finger 52 then strips the batch from the table and it falls onto document conveyor 60 between the pair of flights 62 forming the zone in which the associated document 66 is located.

Because the processor knows the first batch is associated with the first document reaching the insertion station, it similarly knows the intended association for subsequent batches and documents.

If the processor 30 receives a "document present" signal from sensor 70 before it stops the feeder and sheet conveyor, it causes the table to reciprocate as soon as the batch has been accumulated on the table and allow s the feeder and conveyor to continue to run in order to begin accumulation of the next batch (S338, 346). In a situation where the processor 30 has not sent a "batch present" signal to the controller 84 by the time a document is at the insertion station, the controller 84 temporarily stops document conveyor 60. With this operation, the system can accommodate variations from batch to batch in batch sizes.

If the account number read from any sheet 32 in a batch does not match that read from the associated document 66, the processor may stop the feeder 12 and conveyor 38 and activate alarm 59 (S322). Also, if the number of sheets counted for a batch is not the same as the batch size read from the associated document 60, again the processor may stop the feeder 12 and conveyor 38 and activate audible alarm 59 (S330).

Optionally, the processor could be loaded with the distance between the reader 68 of document conveyor 60 and the insertion station 80 and receive a document conveyor speed signal in order to track the progress of documents 66 from the reader to the insertion station. In this case, the collator 10 could be modified so that the processor 30 controlled the speed of the feeder 12 and sheet conveyor 38 in order that the entire first batch was stacked on table 50 by the time the associated document reaches insertion station 80. Given this optional operation, it is noted that as soon as the processor receives a batch size from document reader 68, the processor will know how many sheets it should have to feed from stack 31. This would assist the processor in determining an appropriate speed of feeding and conveying of the sheets to table 50. With this operation, it will be apparent that the speed of feeding and conveying of sheets varies, as necessary, so that an entire batch which is associated with a document 66 is stacked on table 50 when the document reaches the insertion station 80.

As shown in FIG. 2, sheets 32 are oriented lengthwise on conveyor 38. If reader 14 can read an account number oriented transversely to the downstream direction D, then sheets 32 may, instead, be oriented so that their length dimension is transverse to the downstream direction D. This allows a greater number of sheets 32 on any given length of sheet conveyor 38.

Optionally, the detector 16 may be a counter which counts each sheet until encountering a marker sheet, which re-initialises the count. Optionally, the detector 16 may comprise a vision system rather than a photocell. Optionally, the reader 14 could comprise a vision system rather than a MICR reader in which case the detector and reader could be combined in one vision system.

Other modifications will be apparent to those skilled in the art and, therefore, the invention is defined in the claims.

What is claimed is:

1. A system for collating sheets each bearing an account number, comprising:
   a feeder for singly feeding sheets;
   a detector for detecting fed sheets;
   a reader for reading an account number on said fed sheets;
   an accumulator downstream of said feeder for accumulating sheets into a stack and for conveying each accumulated stack downstream;
   a processor for:
      receiving an account number and batch size read from each of a plurality of documents on a document conveyor;
      obtaining a batch count for a given batch of sheets based on indications from said detector;
      receiving from said reader said account number read from each sheet of said given batch;
      comparing said received indication of a batch quantity read from one of said documents with said batch count obtained for said given batch;
      comparing said received account number read from said one of said documents with said account number read from each sheet in said given batch; and
      acting based on each said comparing.

2. The system of claim 1 wherein said processor, when obtaining, determines a count for each batch of sheets between a pair of markers.

3. The system of claim 2 wherein each of said markers comprises a sheet having a pre-defined characteristic detected by said detector.

4. The system of claim 3 further comprising:
   a diverter between said detector and reader on the one hand and said accumulator on the other for diverting each sheet having said pre-defined characteristic.

5. The system of claim 4 wherein said feeder is a pulse wheel feeder.

6. The system of claim 3 wherein said detector detects each sheet fed by said feeder and detects a sheet having said pre-defined characteristic differently from a sheet not having said pre-defined characteristic.

7. The system of claim 1 wherein said processor, when acting, takes an alarm action if said received account number read from said one of said documents does not match said account number read from each sheet in said given batch.

8. The system of claim 7 wherein said processor, when acting, takes an alarm action if said received indication of a batch quantity read from said one of said documents does not match said batch count obtained for said given batch.

9. The system of claim 8 wherein said alarm action comprises stopping said feeder.

10. The system of claim 1 wherein said processor is also for receiving a signal when said one of said documents is at said accumulator, for tracking when said given batch has been accumulated into a stack at said accumulator, and, when said signal has been received and said given batch has been accumulated into a stack, for operating said accumulator in order to convey said given batch downstream.

11. The system of claim 10 wherein said processor, controls said feeder to feed sheets of said given batch and stops said feeder once said given batch is at said accumulator if said processor has not received said signal.

12. The system of claim 11 further comprising a document reader for reading an account number and batch number from documents on said conveyor and wherein said processor is responsive to an output of said document reader.

13. The system of claim 1 wherein each sheet of said given batch comprises a negotiable instrument and wherein each of said documents comprises a statement summarising negotiable instruments of said given batch.

14. The system of claim 1 wherein said accumulator is a reciprocating table.

15. The system of claim 1 wherein said accumulator is for conveying each accumulated stack to said document conveyor at a position on said document conveyor occupied by said one of said documents.

16. The system of claim 15 wherein said accumulator is responsive to said processor for conveying a stack when prompted by said processor.

17. The system of claim 16 wherein said accumulator is a reciprocating table.

18. A system for collating sheets each bearing an account number, comprising:
   means for singly feeding sheets;
   means for detecting fed sheets;
   means for reading an account number on said fed sheets;
   means, downstream of said means for feeding, for accumulating sheets into a stack and for conveying each accumulated stack downstream;
   processor means for:
      receiving an account number and batch size read from each of a plurality of documents on a document conveyor;
      obtaining a batch count for a given batch of sheets based on indications from said detector;
      receiving from said reader said account number read from each sheet of said given batch;
      comparing said received indication of a batch quantity read from one of said documents with said batch count obtained for said given batch;
      comparing said received account number read from said one of said documents with said account number read from each sheet in said given batch; and
      acting based on each said comparing.

19. A system for collating sheets each bearing an account number, comprising:
   a feeder for singly feeding sheets;
   a sheet conveyor extending downstream from said feeder;
   a detector associated with said sheet conveyor for detecting fed sheets;
   a reader associated with said sheet conveyor for reading an account number on said fed sheets;
   an accumulator at an output of said sheet conveyor for accumulating sheets into a stack and for conveying each accumulated stack downstream;
   a processor for:

receiving an account number and batch size read from a first document on a document conveyor;

obtaining a batch count for a first batch of sheets based on indications from said detector;

receiving from said reader said account number read from each sheet of said first batch;

comparing said received indication of a batch quantity read from said first document with said batch count obtained for said first batch;

comparing said received account number read from said first document with said account number read from each sheet in said first batch; and based on each said comparing, selectively establishing an alarm condition.

20. The system of claim 19 wherein said processor is also for receiving a signal when said first document is at said accumulator, for tracking when said first batch has been accumulated into a stack at said accumulator, and, when said signal has been received and said first batch has been accumulated into a stack, for operating said accumulator in order to convey said first batch downstream.

21. A system for collating sheets each bearing an account number, comprising:

a feeder for singly feeding sheets;

a detector and reader for detecting fed sheets and for reading an account number on said fed sheets;

an accumulator downstream of said feeder for accumulating sheets into a stack and for conveying each accumulated stack downstream;

a processor for:
receiving an account number and batch size read from each of a plurality of documents on a document conveyor;

obtaining a batch count for a given batch of sheets based on indications from said detector and reader;

receiving from said detector and reader said account number read from each sheet of said given batch;

comparing said received indication of a batch quantity read from one of said documents with said batch count obtained for said given batch;

comparing said received account number read from said one of said documents with said account number read from each sheet in said given batch; and acting based on each said comparing.

22. A method for collating sheets each bearing an account number, comprising:

singly feeding sheets from a stack;

detecting sheets fed from said stack;

reading an account number on said sheets fed from said stack;

receiving an account number and batch size read from each of a plurality of documents on a document conveyor;

obtaining a batch count for a given batch of sheets based on said detecting;

comparing said received indication of a batch quantity read from one of said documents with said batch count obtained for said given batch;

comparing said received account number read from said one of said documents with said account number read from each sheet in said given batch; and acting based on each said comparing.

23. The method of claim 22 further comprising, provided said batch quantity matches said batch count and said received account number matches with said account number read from each sheet in said given batch, accumulating said given batch and synchronising said given batch with said one of said documents.

* * * * *